United States Patent [19]

Erb et al.

[11] Patent Number: 5,115,560
[45] Date of Patent: May 26, 1992

[54] TERMINAL INSERTION APPARATUS HAVING IMPROVED TURNTABLE ASSEMBLY

[75] Inventors: David J. Erb; Keith L. Nicholas; Howard C. Phillips; John M. Wasilko, all of Harrisburg, Pa.

[73] Assignee: AMP Incorporated, Harrisburg, Pa.

[21] Appl. No.: 770,678

[22] Filed: Oct. 3, 1991

[51] Int. Cl.⁵ .............................................. H01R 43/00
[52] U.S. Cl. ........................................ 29/747; 29/759; 29/760; 29/785; 29/792
[58] Field of Search ................ 29/747, 759, 760, 785, 29/787, 790, 792, 795–797

[56] References Cited

U.S. PATENT DOCUMENTS

| | | | |
|---|---|---|---|
| 2,025,268 | 12/1935 | Bullard | 29/38 |
| 2,390,596 | 12/1945 | Larsen | 29/288 |
| 4,449,289 | 5/1984 | Kindig | 29/596 |
| 4,860,413 | 8/1989 | Woodward | 29/38 C |
| 5,031,295 | 7/1991 | Schmitt | 29/33 J |

OTHER PUBLICATIONS

Daedal Positioning Tables & Controls, Daedal 110M, Aug. 1989, pp. 94-07 and 103-105.

Primary Examiner—Carl E. Hall

[57] ABSTRACT

A machine for inserting terminals (12) into housings (10) on an electrical device (4) comprises an inserting apparatus (34) in combination with a turntable assembly (32). The turntable assembly comprises a main turntable (38) and a plurality of secondary turntables (40) on the main turntable. The secondary turntables (40) are individually rotatable with respect to the main turntable (38) so that an electrical device (4) mounted on a secondary turntable (40) can be reoriented thereby to permit a wide variety of insertion operations to be performed on the device, for example, where the terminals (12) must be inserted into housings (10) arranged in two or more rows. The secondary turntables can be rotated to position each row in alignment with the fixed insertion machine (34).

20 Claims, 11 Drawing Sheets

TERMINAL INSERTION APPARATUS HAVING IMPROVED TURNTABLE ASSEMBLY

FIELD OF THE INVENTION

This invention relates to insertion apparatus for inserting terminals into electrical devices, such as connectors or housings, and to improved turntables for terminal insertion apparatus or similar assembly machines.

BACKGROUND OF THE INVENTION

The manufacturer of many types of electrical devices, such as coil assemblies, switches, and electrical connectors, frequently requires that terminals be inserted into terminal receiving cavities in the electrical device. A variety of automatic insertion machines have been developed and are used for these inserting operations. It is desirable that insertion operations be carried out with machines which are fully automatic or nearly so in order to reduce the assembly cost.

In accordance with one aspect thereof, the invention is directed to the achievement of an improved turntable type machine for inserting electrical terminals into terminal receiving cavities in an electrical device such as a coil assembly or a multi-contact electrical connector. Particularly, the invention is directed to the achievement of a machine which has the capability of reorienting or repositioning the electrical device so that terminals can be inserted into cavities at different locations on the electrical device.

In accordance with a further aspect thereof, the invention is directed to the achievement of an improved turntable type machine which can be used for assembly operations and which has the capability of repositioning the articles being assembled on the main turntable thereby to increase the flexibility and versatility of the machine.

THE INVENTION

One embodiment of the invention comprises an inserting apparatus in combination with a turntable assembly for inserting terminals into terminal receiving cavities in an electrical device. The electrical device has at least two cavities which are at different locations on the electrical device. The turntable assembly and the inserting apparatus are supported on a supporting means and are characterized in that the turntable assembly comprises a main turntable and a plurality of secondary turntables on the main turntable. Each of the secondary turntables has a fixture thereon for holding one of the electrical devices. The main turntable is rotatable about a main axis and each of the secondary turntables are rotatably about their own secondary axes, the secondary axes being parallel to the main axis and are spaced apart around the main axis. The inserting apparatus is located adjacent to the main turntable at a terminal insertion station and is effective to insert a terminal into a first cavity in the electrical device on a secondary turntable which is in a first position of rotation relative to the main turntable. The insertion apparatus is also effective to insert a terminal into a second cavity when the secondary turntable is in a second position of rotation. Actuating and controlling means are provided for indexing the main turntable thereby to position each of the secondary turntables at the insertion station with a first cavity in alignment with the insertion apparatus, for thereafter actuating the insertion apparatus, for thereafter indexing the one secondary turntable thereby to locate a second cavity in alignment with the insertion apparatus, and for again actuating the inserting apparatus to insert a terminal into the second cavity.

The invention, in accordance with a further aspect thereof, is directed to the achievement of a turntable assembly comprising a main turntable and a plurality of secondary turntables rotatably mounted on the main turntable. Main actuating means are provided for indexing the main turntable and secondary actuating means are provided for indexing each of the secondary turntables. The turntable assembly is characterized in that the secondary actuating means for rotating the secondary turntables comprises a rotatory actuator mounted on the support which supports the turntable assembly. Actuator coupling means are provided on the secondary actuating means and secondary turntable coupling means are provided on each of the secondary turntables. The secondary turntable coupling means of each secondary turntable and the actuator coupling means are engageable with each other when the main turntable comes to rest in an indexed position and are disengageable from each other upon movement of the main turntable from the indexed position. The actuator coupling means and each individual secondary turntable coupling means are effective to couple the secondary actuating means to each of the secondary turntables for rotatory motion while permitting linear movement of the secondary turntable coupling means with respect to the actuator coupling means. The actuator coupling means and each of the secondary turntable coupling means have interengageable portions which permit linear movement of the secondary turntable coupling means when the parts are inner engaged but which require rotary motion of the secondary turntable when the rotary actuator is rotating or when the main turntable is rotated.

THE DRAWING FIGURES

THE DISCLOSED EMBODIMENT

Figure 1:
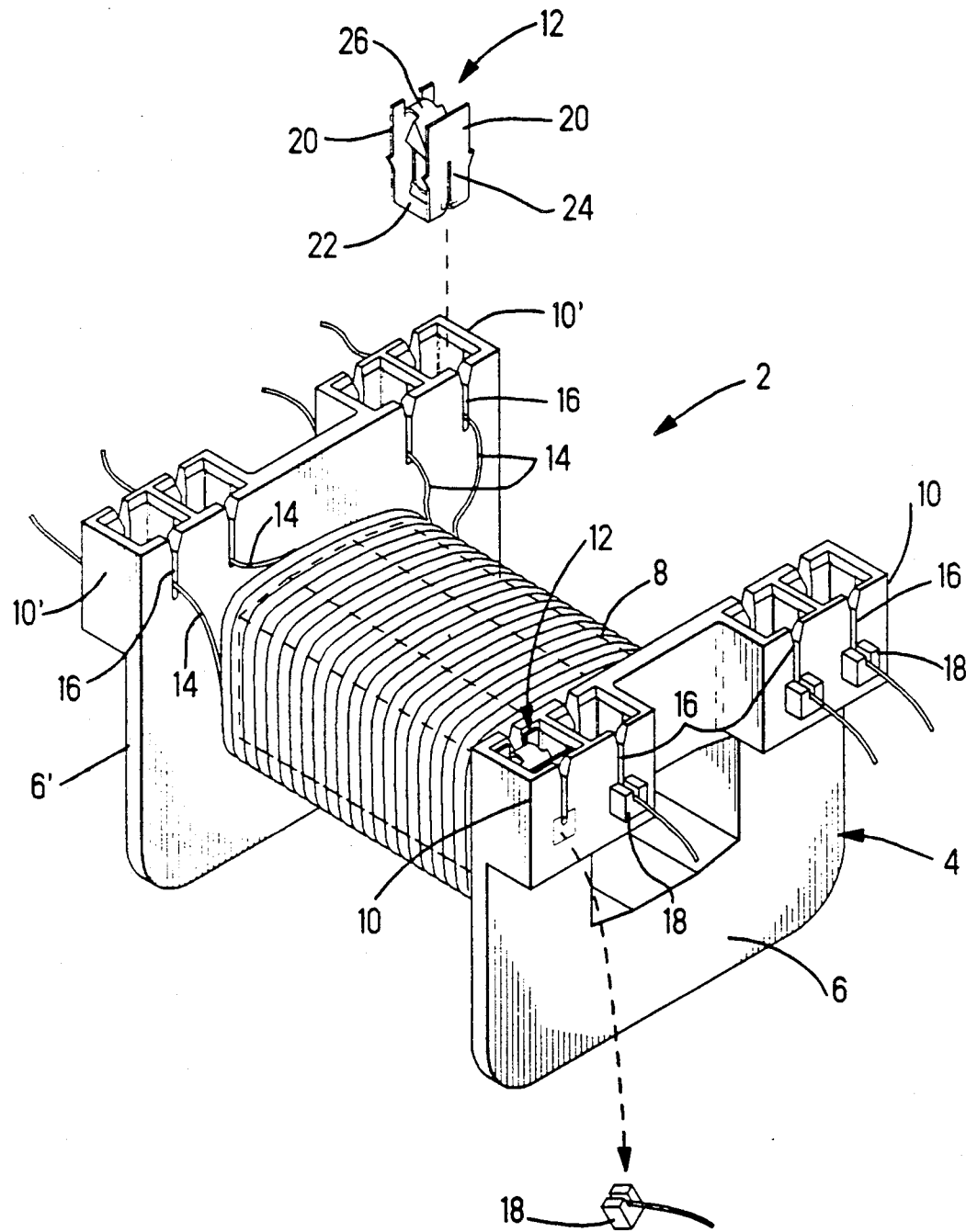
FIG. 1 is a perspective view of a typical coil assembly.

A typical coil assembly 2. FIG. 1, comprises a bobbin 4 having end flanges 6,6' between which a winding support extends. The coil windings 8 are wound around the support and between the opposed surfaces of the flanges. The flange 6 has a row of terminal housings 10 thereon and the flange 6' has a similar row of housings 10'. When electrical connections made to a tap wire 14 which extends from the coil, the tap wire is positioned in aligned slots 16 in one of the housings so that the wire extends across the interior of the housing. An electrical terminal 12 is then inserted into the housing. Each terminal comprises a pair of parallel plate like sections 20 which are connected to each other by a connecting section or bight 22. Wire receiving slots 24 extend into these plate sections and a wire receiving opening is provided in the bight so that as the terminal 12 is moved downwardly from the position of FIG. 1, the tap wire 14 will move relatively into the wire receiving slots 24 thereby establishing electrical contact between the wire and the terminal. The terminal has a tongue 26 extending from one of the plate sections inwardly so that a tab on the end of an external conductor can be inserted into the housing to establish contact with the external conductor. The housings have integral supports or anvils 18 on their external surfaces which support the wire 14. These anvils are sheared from the surface of the housing when the terminal is inserted and the end portion of the wire is also sheared from the wire in the plane of the housings. Bobbins of this type are shown in U.S. Pat. No. 4,166,265.

Figure 2:
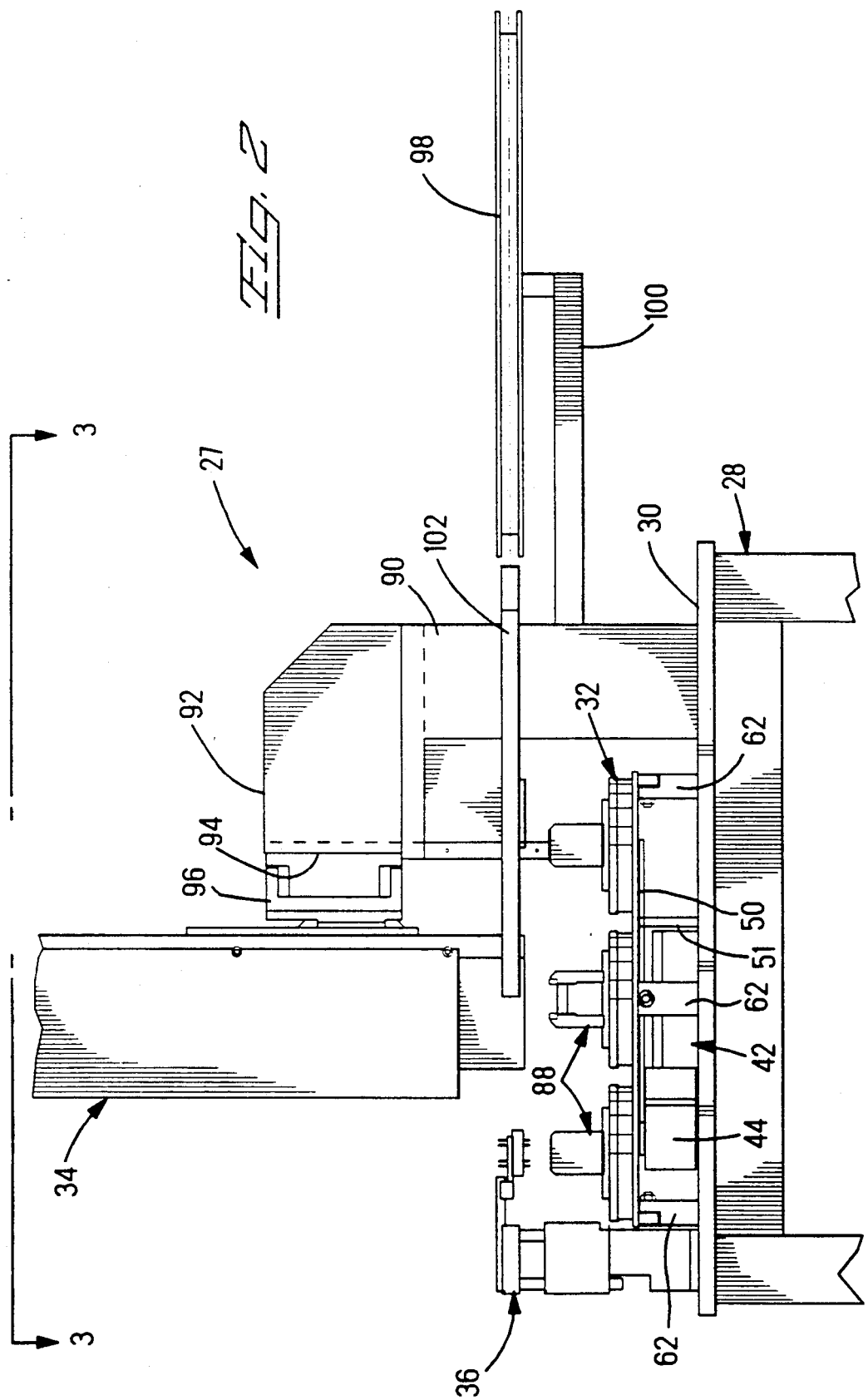
FIG. 2 is a front view of an inserting apparatus and turntable assembly in accordance with the invention.
Figure 3:
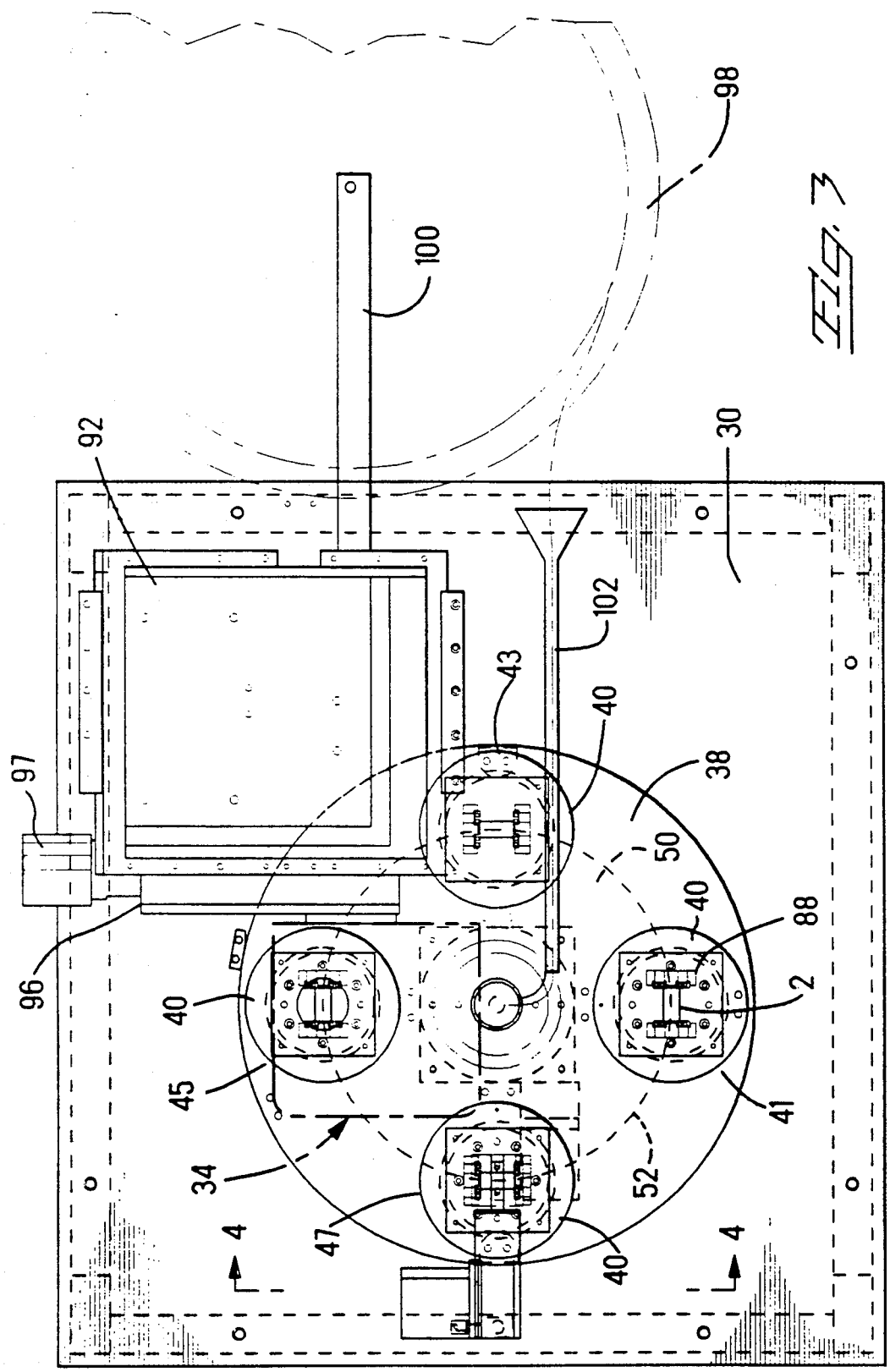
FIG. 3 is a top plan view looking in the direction of the arrows 3—3 of FIG. 2.
Figure 4:
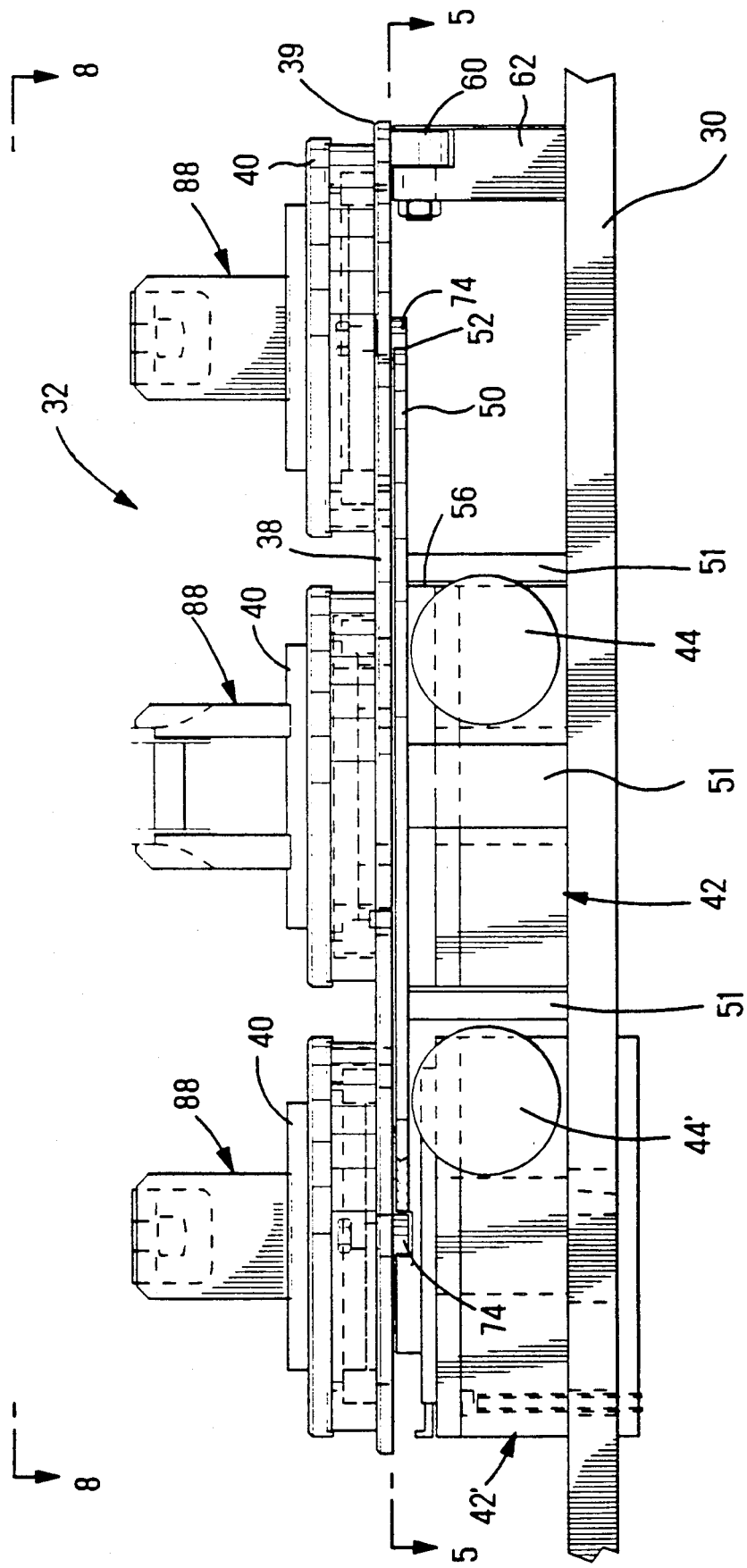
FIG. 4 is a view, on an enlarged scale, of the turntable assembly looking in the direction of the arrows 4—4 of FIG. 3.

As shown in FIGS. 2, 3, and 4, the inserting apparatus 34 and turntable assembly 32 are supported on the upper surface 30 of a support table 28. The complete apparatus comprises the turntable assembly 32, the inserting machine 34, and a testing apparatus 36.

The turntable assembly 32 comprises a main turntable 38 having a peripheral edge 39 and four secondary turntables 40 which are supported on the obverse or upper surface of the main turntable at 90 degree intervals. The main turntable is rotatable about a main axis and each of the secondary turntables is rotatable about its own secondary axis. Indexing of the main turntable 38 moves the secondary turntables successively to a loading and unloading station 41, to an insertion station 45, and to a testing station 47. The station 43 is not used in the embodiment shown but an additional insertion apparatus can be provided at this station or another apparatus for performing an additional operation on the workpiece.

Figure 5:
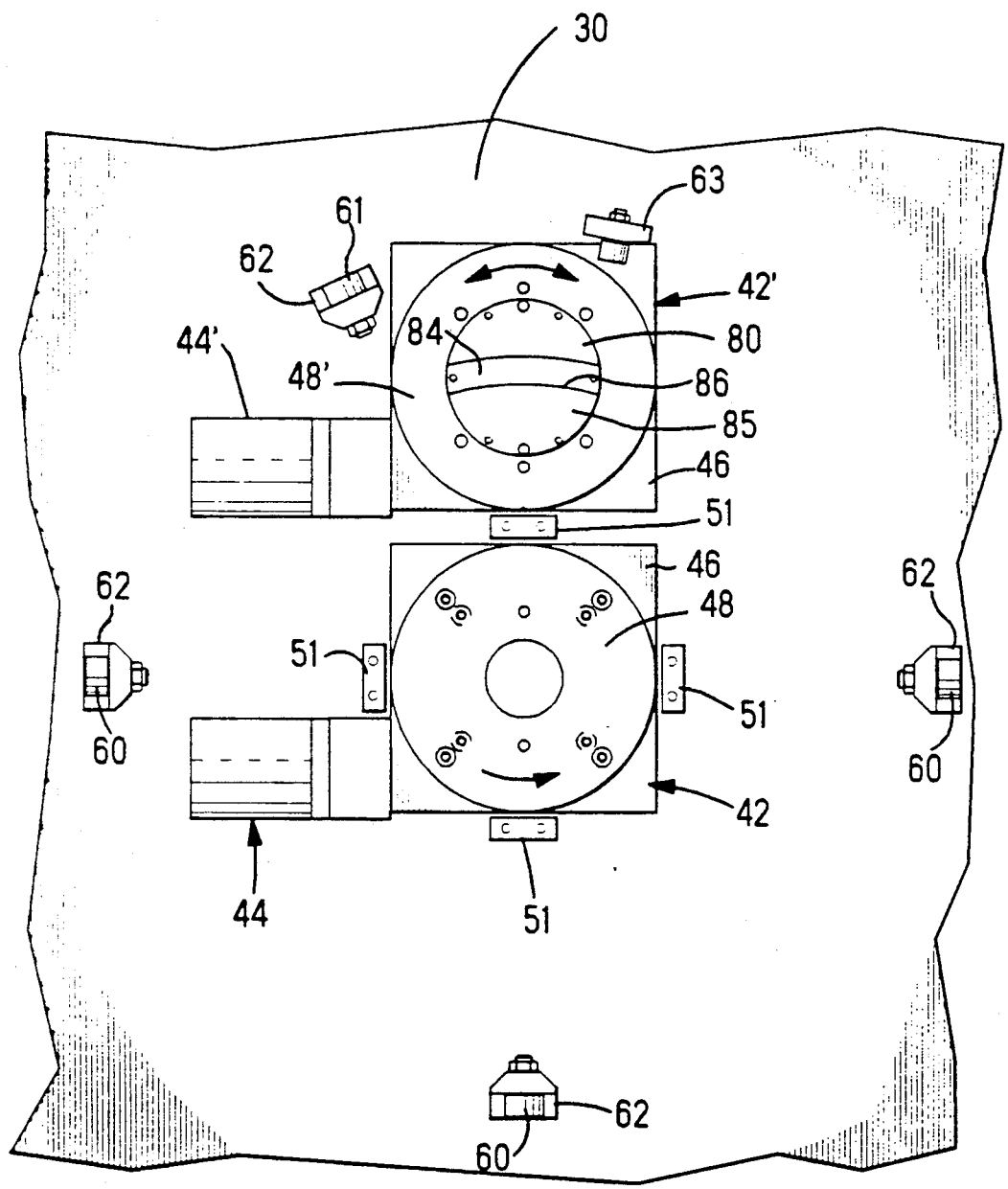
FIG. 5 is a view looking in the direction of the arrows 5—5 of FIG. 4 showing the actuators for the main turntable and for the secondary turntables.

The main turntable is indexed through an angle of 90 degrees during each operating cycle by a main turntable actuator 42, FIGS. 4 and 5, which comprises a stepping motor 44 having an output shaft which extends into a gear housing 46. The gear housing has a worm gear drive therein which rotates a driven plate or table 48 on the upper surface of the housing 46. Positioning devices of this type are commonly available. The drive mechanism shown is a 20,000 Series Rotary Positioning Table produced by Daedal Positioning Tables and Controls, Box 500, Harrison City, Pa., 15636, U.S.A. Actuator 42 and an additional actuator 42' are mounted on surface 30 adjacent to the lower or reverse surface of turntable 38.

Figure 6:
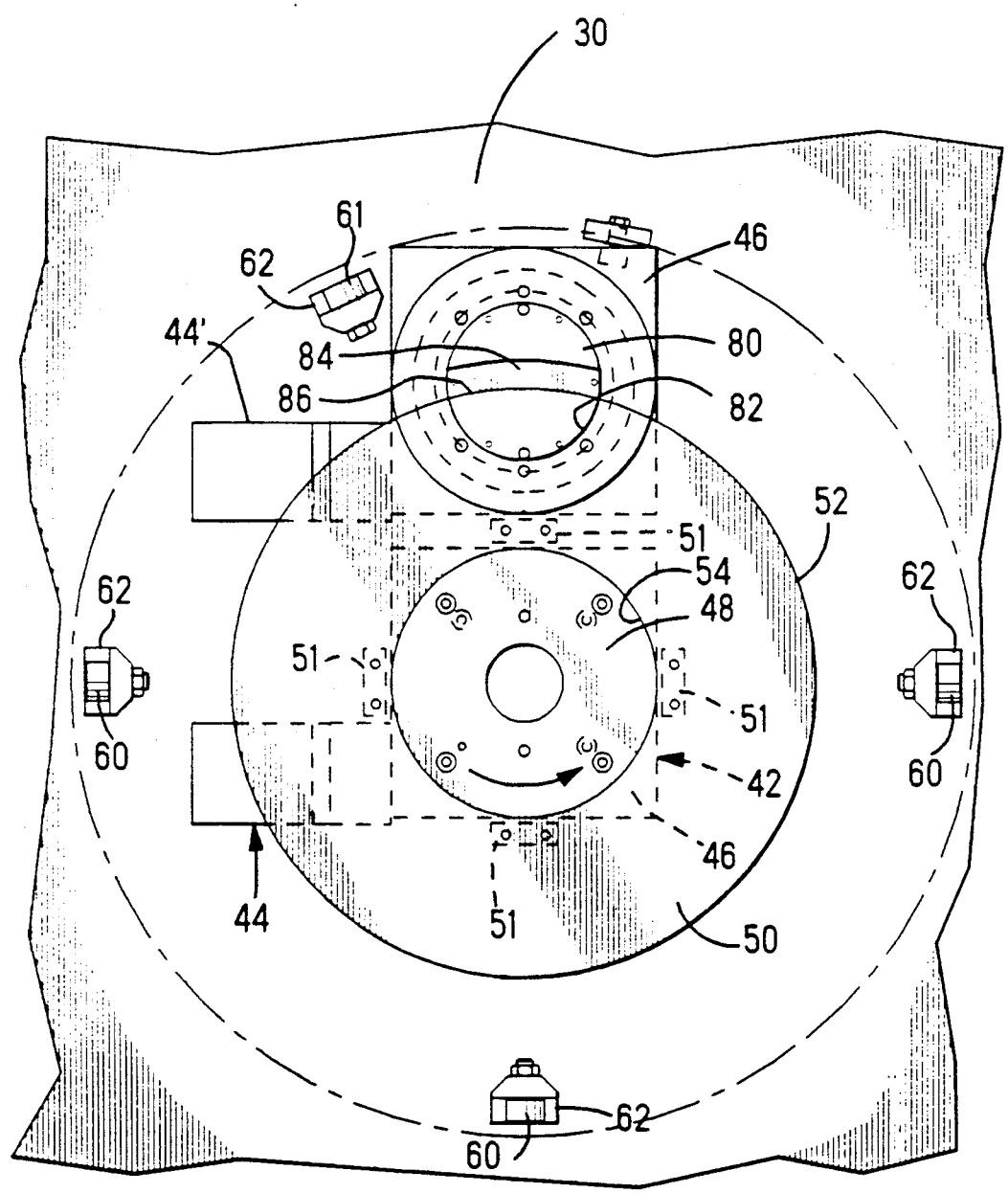
FIGS. 6 and 7 are views similar to FIG. 5 but taken on planes immediately above the plane of FIG. 4.

A fixed circular plate 50, is supported by spaced apart support columns 51 above the surface 30 and is substantially coplanar with the driven plate 48 of the actuator. This fixed circular plate 50 has a peripheral edge 52 which is spaced inwardly from the peripheral edge (39) of the main turntable and has a circular opening 54, FIG. 6, which has a diameter slightly greater than the diameter of the plate 48. A spacer plate 56 is secured by fasteners to the plate 48 and is also secured by fasteners to the downwardly facing surface of the main turntable 38. The main turntable is thus supported on the spacer plate 56 and on the plate 48 and is also supported at its periphery by support rollers 60 which are mounted on pedestals 62. Three of these support rollers are located at 90 degree intervals from each other while a fourth roller 61 is located relatively closer to the adjacent roller on the left as shown in FIG. 5. An additional roller 63 is mounted adjacent to the actuator 42' for the secondary turntables. Because of the location of this actuator 42', the roller 61 can not be positioned at a 90 degree interval from the adjacent rollers.

Figure 7:
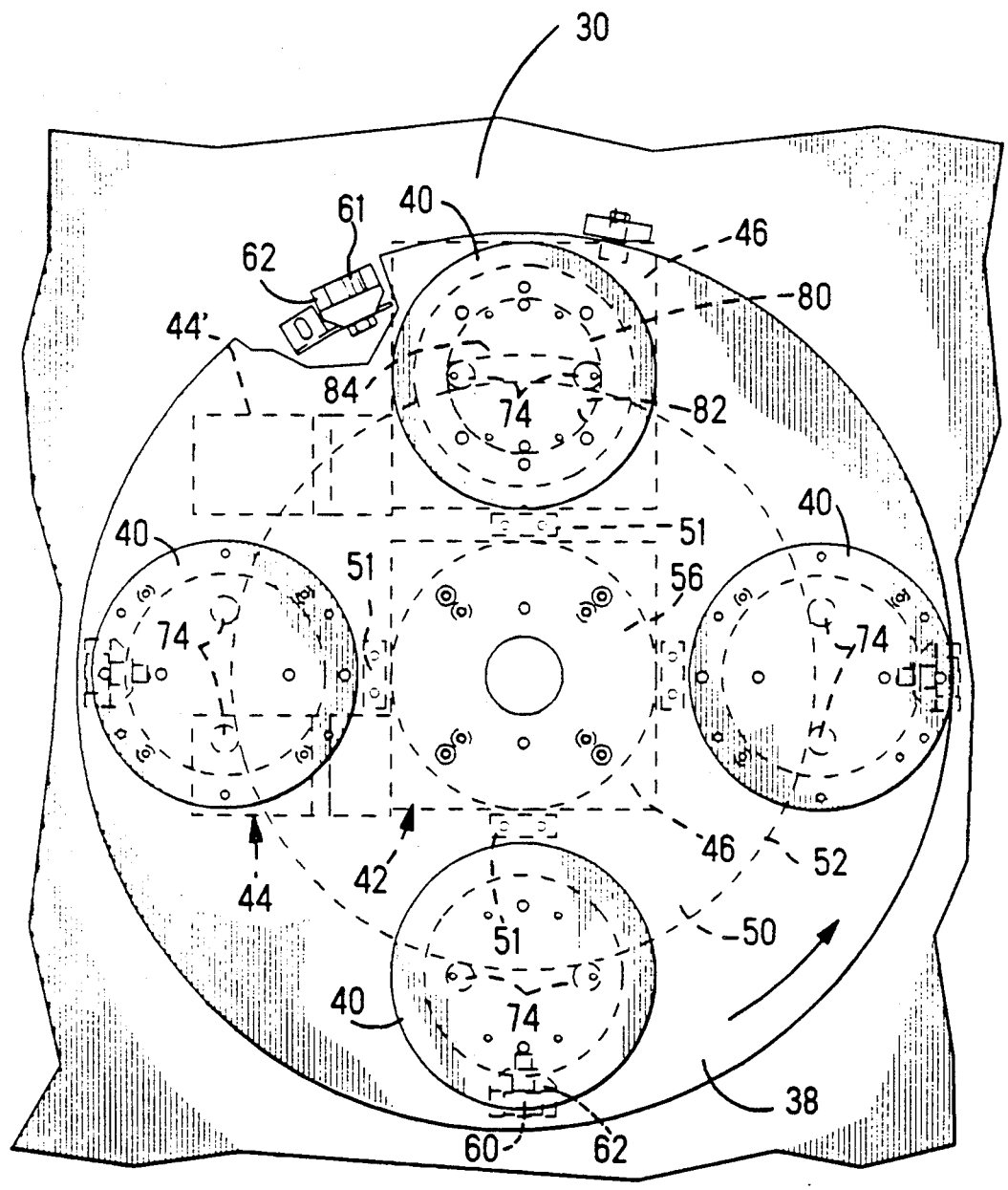
Figure 8:
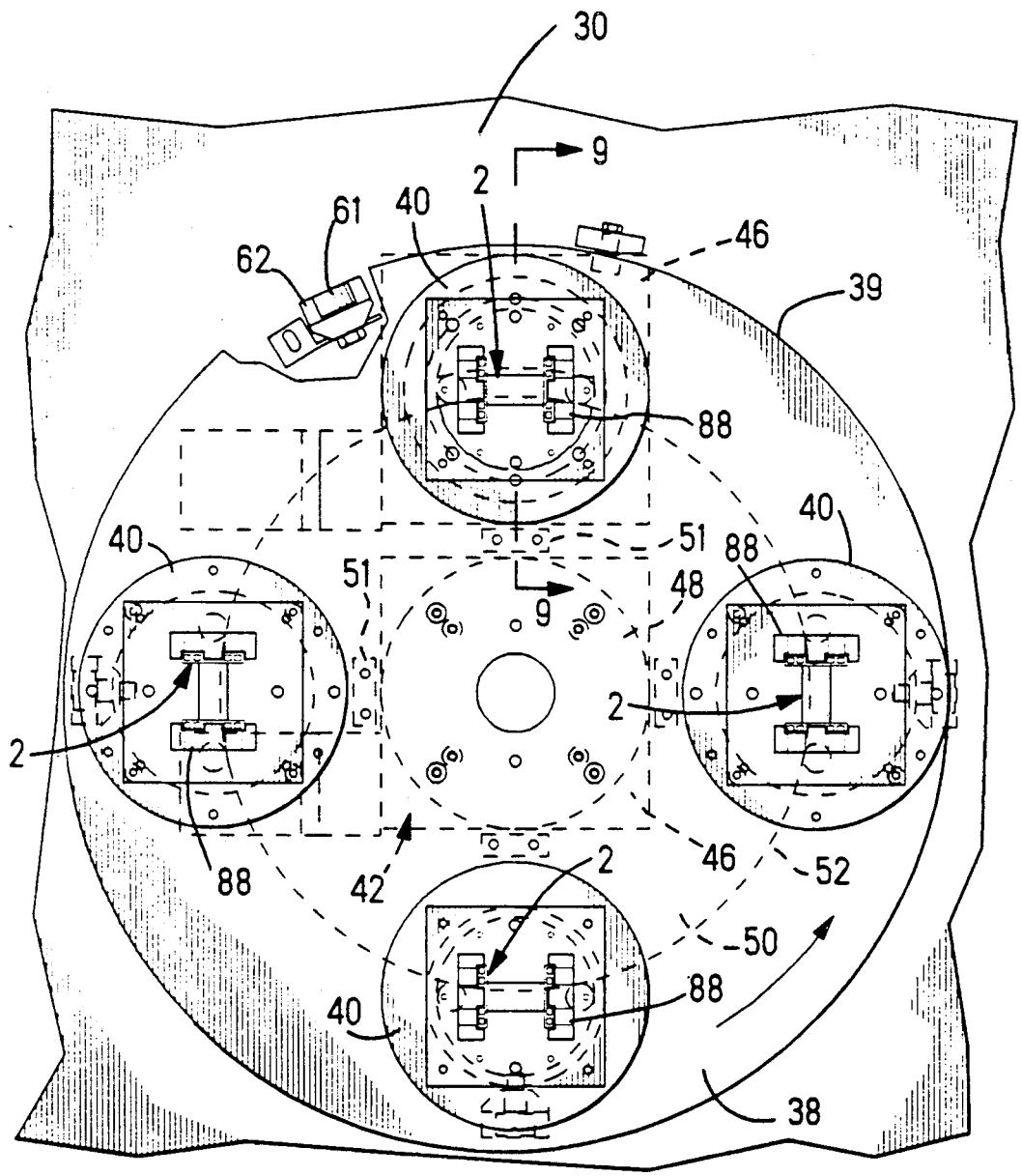
FIG. 8 is a top plan view of the main turntable and secondary turntables looking in the direction of the arrows 8—8 of FIG. 4.
Figure 9:
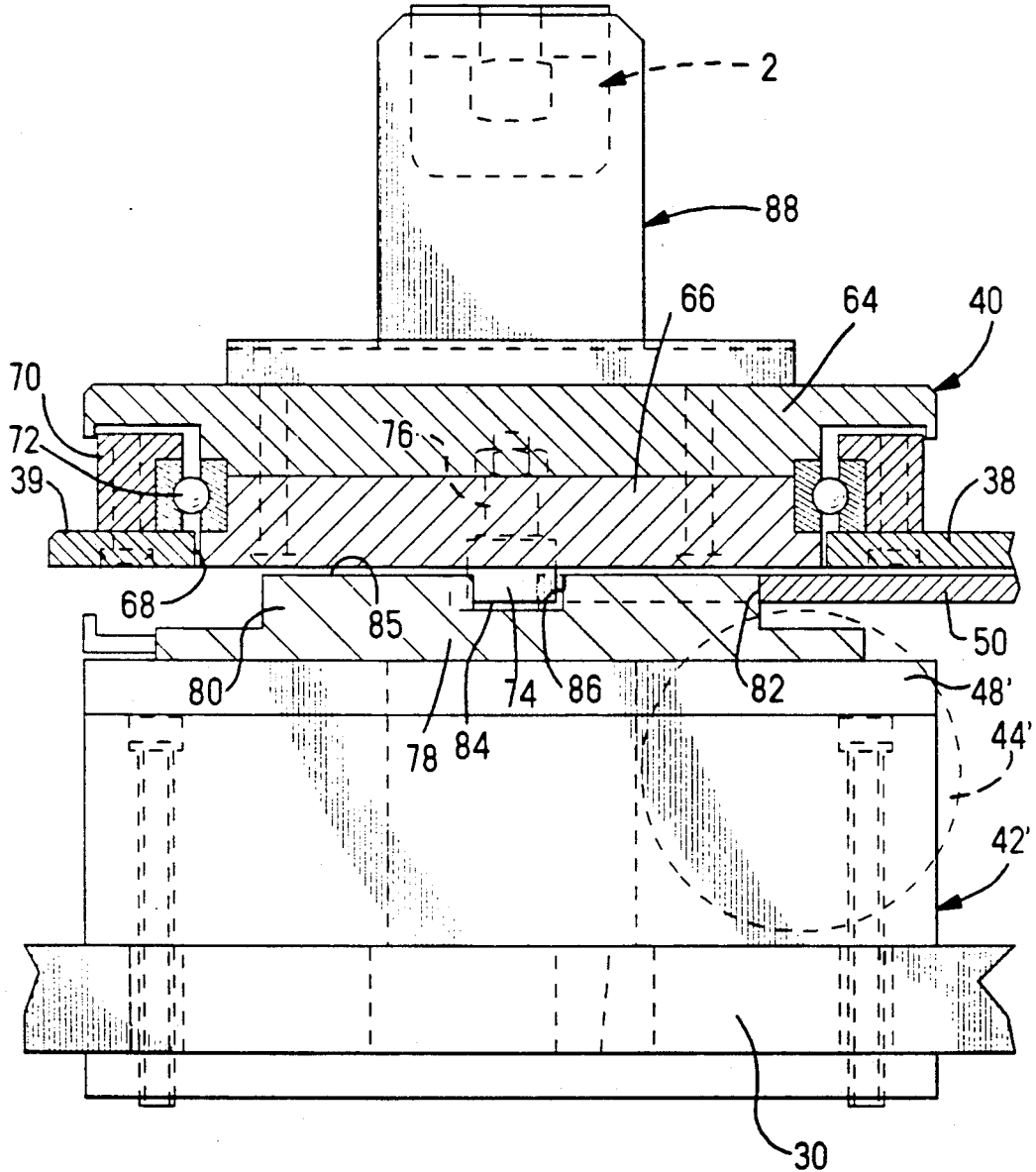
FIG. 9 is a sectional view looking in the direction of the arrows 9—9 of FIG. 8.

Each of the secondary turntables 40, FIGS. 7-9, comprises an upper turntable plate 64, FIG. 9, and a lower turntable plate 66 which is secured to the underside of the plate 64. The main turntable 38 has a circular hole 68 for each of the secondary turntables and the secondary turntables are rotatably supported on the main turntable by fixed bearing housings 70 and ball bearings 72 which are between the sides of the secondary turntable plates 64,66 and the housing 70.

Figure 10:
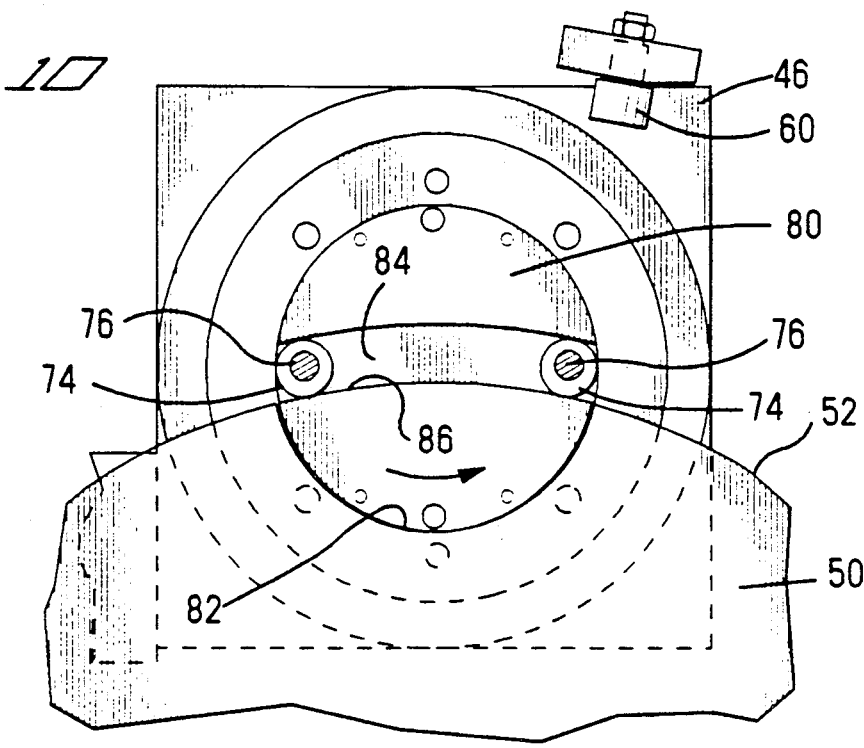
FIG. 10 is a top plan view showing the coupling between the actuator for the secondary turntables and a secondary turntable, this view showing the positions of the parts prior to rotation of the secondary turntable.
Figure 11:
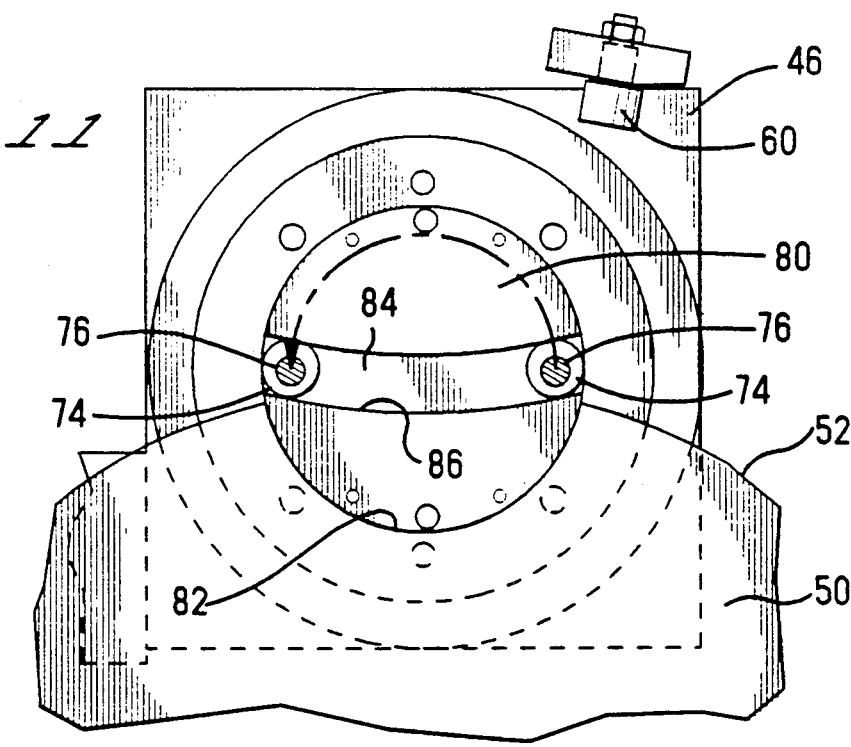
FIG. 11 is a view similar to FIG. 10 but showing the positions of the parts after rotation of the secondary turntable.

Two spaced apart rollers 74, FIGS. 9 and 10, are mounted on the downwardly facing surface of the plate 66 and bear against the peripheral edge 52 of the fixed circular plate 50. These rollers are eccentrically mounted on shafts 76 so that their precise locations can be adjusted thereby to ensure contact with the peripheral edge 52 of the fixed plate 50 and also to ensure that they will be received in a channel in a coupling plate 78. The rollers serve as coupling members in cooperation with a channel 84 in a coupling plate 78 which is mounted on the plate 48' of the actuator 42' for the secondary turntables. Actuator 42' is identical to the actuator 42 described above. The rotatable plate 48' of the actuator 42' has the coupling plate 78 secured to this upper surface. The coupling plate has a reduced diameter upper portion 80 which is received in a notch 82, FIG. 10, in fixed plate 50. An arcuate channel 84 extends across the upper surface 85 of plate 78 and has one side 86 which has the same curvature as the edge 52 of the fixed plate 50. When the coupling plate 78 is rotated through an angle of 180 degrees by the actuator 44', the secondary turntable which is positioned at the insertion station will be rotated through an angle of 180 degrees as illustrated in FIGS. 10 and 11. The rollers 74 and the channel 84 thus act as a coupling between the secondary turntable and the actuator. This coupling permits linear movement along a circular path of the secondary turntable 40 from the position of FIG. 10 but requires rotary movement of the secondary turntable when the plate 78 is rotated by the actuator 44'.

A fixture 88 for the coil assembly is mounted on the upper surface of the plate 64 in an orientation such that when the turntable arrives at the insertion station, the coil assembly will be oriented such that the first row of housings 10 will be an alignment with the insertion tooling on the insertion apparatus 34. Rotation of the secondary turntable aligns the second row of terminal housings 10' with the insertion tooling.

The insertion apparatus 34 is supported on the end of an arm 92 of a fixed vertically extending support 90 which is adjustably mounted on the surface 30. The end of this arm has a flat vertical surface 94 on which there is mounted a linear indexing mechanism 96. This linear indexing mechanism can be of a commonly available type and is identified as a cross roller table, 60,000 Series and is available from Daedal Positioning Systems and Controls as explained above. Indexing mechanism 96 is operated by a stepping motor 97.

The terminals are supplied in strip form and are supported on a reel 98 which is in turn supported on a bracket 100. A guide 102 extends from the reel to the insertion apparatus 34. The insertion apparatus, during each operating cycle, severs the leading terminal from the strip and pushes it into the housing which is in alignment with the insertion tooling. Inserting apparatus of this type are widely known and any one of a number of insertion apparatus types can be used.

Figure 12:
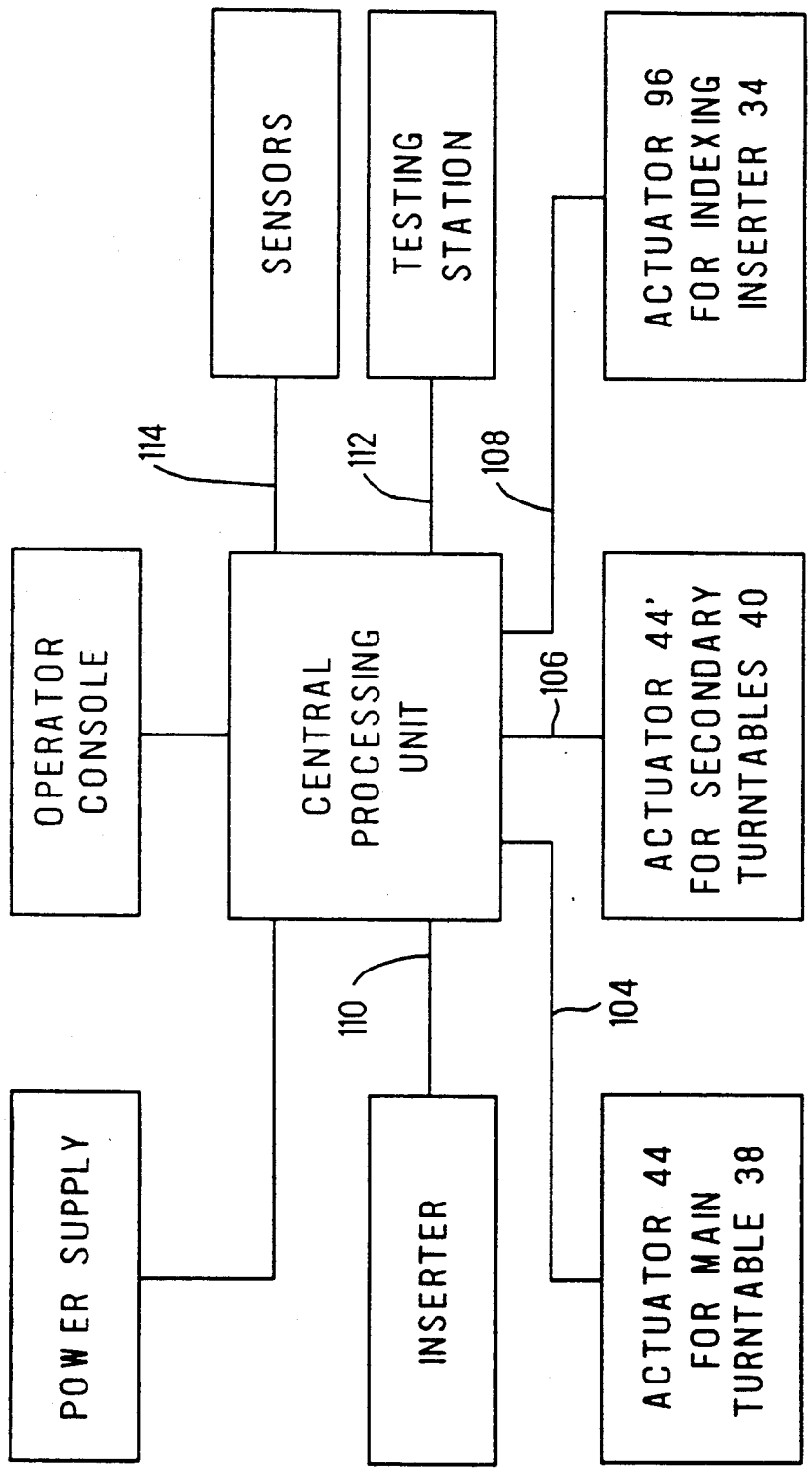
FIG. 12 is a block diagram of a control system for the apparatus.

The electronic control system for the machine as a whole is shown in FIG. 12. All of the operations are controlled by a central processing unit which typically is a microprocessor. The processing unit is in turn under the control of an operator by means of the operator's console. The processing unit has cables 104,106,108 extending to the main turntable actuator 42, to the secondary turntable actuator 42', and to the linear actuator 96 for indexing the insertion apparatus 34 thereby to position the bobbins in alignment with the insertion tooling. The insertion tooling is controlled by a cable 110 extending directly to the insertion apparatus 34 and will control the various solenoids and switches in the apparatus for carrying out the terminal shearing and inserting operations. The testing station is connected to the central processing unit by a cable 112 which transmits information regarding coil assemblies which have had terminals connected to their tap wires. In the event of an improper connection in a particular coil assembly, the central processing unit will record this information and inform the operator. Sensors (not shown in the drawing) are provided at convenient locations to sense the various functions of the machine such as the positions of the primary and secondary turntables and the operations of the insertion apparatus. The sensors are connected to the central processing unit by cable 114.

During a complete operating cycle, the operator will remove a coil assembly 2 at the loading station 41 and position another coil assembly on the fixture 88. During the interval of loading and unloading, the terminals 12 will be inserted into the two rows of housings 10,10' on the bobbin 4 which is located at the insertion station. This will require rotation of the secondary turntable 40 in order to position both rows of terminals in alignment with the insertion tooling. Also during this interval, the testing apparatus 36 will be engaged with a previously wired coil assembly and perform the required electrical tests. The main turntable 38 is indexed after a coil assembly has been loaded at the loading station and another coil assembly is moved to the insertion station. The coil assembly which is transported from the insertion station to the testing station is tested during the next cycle. The loading and unloading operations can be carried out with a robot rather than being carried out manually as described above.

The turntable system having a control system as described above is highly versatile and can be adapted for use in a wide variety of assembly operations. The main turntable 38 can be rotated through any desired angle so that any desired number of stations can be provided on the surface 30. The secondary turntables 40 can also be rotated through any angle desired and can be indexed as many times as desired while the main turntable is at rest. The stepping motors (or alternatively servo motors) are capable of rotating the turntables by very slight amounts so that precise positioning of a workpiece is possible.

An overall advantage of the invention is that all of the operations required to connect wires in a coil assembly, or other electrical device, to terminals are carried out automatically and the required testing steps are carried out to ensure that the device is properly wired. An advantage of the embodiment described above is that the turntable assembly is highly versatile in that the interval of indexing of the main turntable and each of the secondary turntables can be fixed at any desired angular interval thereby making the apparatus suitable for use with a wide variety of electrical devices.

We claim:

1. An inserting apparatus in combination with a turntable assembly for inserting terminals into terminal receiving cavities in an electrical device, the electrical device having at least two cavities which are at different locations on the electrical device, the turntable assembly and the inserting apparatus being supported on a supporting means, the inserting apparatus and turntable assembly being characterized in that:

the turntable assembly comprises a main turntable and a plurality of secondary turntables on the main turntable, each of the secondary turntables having fixture means thereon for holding one of the electrical devices, the main turntable being rotatable about a main axis, each of the secondary turntables being rotatable about its own secondary axis, the secondary axes being parallel to the main axis and being located at intervals around the main axis, the inserting apparatus being located proximate to the main turntable at a terminal insertion station, the inserting apparatus being effective to insert a terminal into a first cavity in an electrical device on a secondary turntable at the insertion station when the secondary turntable is in a first position of rotation relative to the main turntable, and being effective to insert a terminal into a second cavity when the secondary turntable is in a second position of rotation, and actuating and control means are provided for indexing the main turntable thereby to position one of the secondary turntables at the insertion station with the first cavity in alignment with the inserting apparatus, for thereafter actuating the inserting apparatus thereby to insert a terminal into the first cavity, for thereafter indexing the one secondary turntable thereby to locate the second cavity in alignment with the inserting apparatus and for again actuating the inserting apparatus thereby to insert a terminal into the second cavity.

2. An inserting apparatus in combination with a turntable assembly as set forth in claim 1 characterized in that the electrical device has first and second rows of cavities, the inserting apparatus is effective to insert a terminal into each cavity in the first row when the secondary turntable is the first position of rotation and is effective to insert a terminal into each cavity of the second row when the secondary turntable is in the second position of rotation, the inserting apparatus being movable relative to the secondary turntable along each of the first and second rows thereby to align the inserting apparatus with each cavity in each row.

3. An inserting apparatus in combination with a turntable assembly as set forth in claim 2 characterized in that the first and second positions of rotation of the secondary turntables are separated by 180 degrees.

4. An inserting apparatus in combination with a turntable assembly as set forth in claim 1 characterized in that the actuating and control means comprises main turntable actuating means for indexing the main turntable and secondary actuating means for indexing the secondary turntables.

5. An inserting apparatus in combination with a turntable assembly as set forth in claim 4 characterized in that the secondary actuating means comprises a rotary positioning table supported on a fixed support, interengageable coupling means are provided on the rotary positioning table and on each of the secondary turntables for coupling each secondary turntable to the rotary table when the secondary turntables are located at the insertion station, the coupling means permitting linear movement of the secondary turntables along an arcuate path to and from the insertion station but requiring rotary movement of the secondary turntable which is at the insertion station when the positioning table is rotated whereby, each of the secondary turntables can move into, and out of, engagement with the rotary table when the main turntable is indexed, and the secondary turntables will be rotated when the positioning table is rotated.

6. An inserting apparatus in combination with a turntable assembly as set forth in claim 5 characterized in that the coupling means comprises an arcuate portion and a portion engageable with the arcuate portion.

7. An inserting apparatus in combination with a turntable assembly as set forth in claim 5 characterized in that the coupling means comprises an arcuate channel and projecting portions which are received in the channel.

8. An inserting apparatus in combination with a turntable assembly as set forth in claim 5 characterized in that the coupling means comprises an arcuate channel in the positioning table and projecting portions on each secondary turntable, the projecting portions being moved into the channel when each secondary turntable moves to the insertion station.

9. An inserting apparatus in combination with a turntable assembly as set forth in claim 8 characterized in that the projecting portions comprise rollers.

10. An inserting apparatus in combination with a turntable assembly as set forth in claim 9 characterized in that a fixed circular plate having a peripheral edge is provided adjacent to the main turntable, the fixed plate having an arcuate notch at the insertion station, the positioning table being in the notch, the arcuate channel having one side which in alignment with the peripheral edge and another side which is spaced outwardly of the one side, the rollers being received between the one side and the other side.

11. An inserting apparatus in combination with a turntable assembly as set forth in claim 5 characterized in that the secondary actuating means comprises a motor having an incrementally rotatable shaft for rotating the rotary positioning table whereby the secondary positioning tables can be rotated by any desired amount.

12. An inserting apparatus in combination with a turntable assembly as set forth in claim 11 characterized in that the motor is a stepping motor.

13. An inserting apparatus in combination with a turntable assembly for inserting terminals into terminal receiving cavities in an electrical device, the electrical device having a plurality of cavities thereon, the turntable assembly and the inserting apparatus being supported on a supporting means, the inserting apparatus and turntable assembly being characterized in that:

the turntable assembly comprises a main turntable and a plurality of secondary turntables, the main turntable having an obverse surface and a reverse surface, the secondary turntables being on the obverse surface, each of the secondary turntables having fixture means thereon for holding one of the electrical devices, the main turntable being rotatable about a main axis, each of the secondary turntables being rotatable about its own secondary axis, the secondary axes being parallel to the main axis and being spaced apart around the main axis, the inserting apparatus being located proximate to the main turntable at a terminal insertion station, the inserting apparatus being effective to insert terminals into the cavities in an electrical device on a secondary turntable at the insertion station, main turntable actuating means are provided for indexing the main turntable and secondary actuating means are provided for indexing the secondary turntables, the secondary actuating means being proximate to the reverse surface and proximate to the insertion station, control means are provided for actuating the main turntable actuating means thereby to locate each secondary turntable at the insertion station and for actuating the secondary actuating means while each secondary turntable is at the insertion station, the secondary actuation means being effective to index the secondary turntables and locate each cavity in alignment with the inserting apparatus.

14. An inserting apparatus in combination with a turntable assembly as set forth in claim 13 characterized in that the secondary actuating means comprises a rotary positioning table supported on a fixed support adjacent to the insertion station, coupling means are provided on the rotary positioning table and on each of the secondary turntables for coupling each secondary turntable to the rotary table when the secondary turntables are located at the insertion station, the coupling means permitting linear movement of the secondary turntables along an arcuate path to and from the insertion station but requiring rotary movement of the secondary turntable which is at the insertion station when the positioning table is rotated whereby, each of the secondary turntables can move into, and out of, coupled engagement with the rotary table when the main turntable is indexed and the secondary turntables will be rotated when the positioning table is rotated.

15. An inserting apparatus in combination with a turntable assembly as set forth in claim 14 characterized in that the coupling means comprises an arcuate in the positioning table and projecting portions on each secondary turntable which are received in the channel.

16. A turntable assembly comprising a support, a main turntable, and a plurality of secondary turntables on the main turntable, the main turntable being rotatably supported on the support and being rotatable about a main axis, the secondary turntables being rotatably supported on the main turntable and being rotatable about their own secondary axes, main turntable actuating means for indexing the main turntable and secondary actuating means for indexing the secondary turntables, the turntable assembly being characterized in that:

the secondary actuating means comprises a rotary actuator mounted on the support.

actuator coupling means are provided on the secondary actuating means and secondary turntable coupling means are provided on each of the secondary turntables, each of the secondary turntable coupling means and the actuator coupling means are engageable with each other when the main turntable comes to rest in an indexed position and are disengageable from each other upon movement of the main turntable from an indexed position whereby, during each operating cycle of the turntable assembly, the main turntable is indexed and one of the secondary turntables is moved to a location proximate to the secondary actuating means, the secondary turntable coupling means on the one secondary turntable is coupled to the actuator coupling means, and upon actuation of the secondary actuator, the one secondary turntable is indexed while the main turntable is at rest, and upon subsequent rotation of the main turntable, the secondary actuator coupling means and the secondary turntable coupling means on the one secondary turntable ar decoupled thereby to permit indexing of the main turntable.

17. A turntable assembly as set forth in claim 16 characterized in that the actuator coupling means and the secondary turntable coupling means have engageable portions which permit linear movement of the secondary turntables relative at to the actuator coupling means when the parts are engaged but which require rotary motion of the secondary turntables when the rotary actuator is rotated.

18. A turntable assembly as set forth in claim 17 characterized in that the engageable portions comprise an arcuate guide track which has the main axis as a center of curvature, and projecting portions which are received in the guide track when the main turntable is rotated about the main axis.

19. A turntable assembly as set forth in claim 16 characterized in that the secondary actuating means comprises a rotary plate mounted on the support, the rotary plate being rotatable about an actuator axis of rotation which is spaced from the main axis by the same distance as the secondary axis, the rotary plate having an arcuate slot therein which has the main axis as a center of curvature, the secondary turntables having projecting portions which are dimensioned to be received in the slot, the actuator coupling means comprising the slot and the projecting portions.

20. A turntable assembly as set forth in claim 16 characterized in that the main turntable has an obverse surface and a reverse surface, the secondary turntables being mounted on the obverse surface, the secondary actuating means being mounted on the support and proximate to the reverse surface.

* * * * *